(12) United States Patent
Lee

(10) Patent No.: US 8,922,531 B2
(45) Date of Patent: Dec. 30, 2014

(54) APPARATUS FOR SCREEN LOCATION CONTROL OF FLEXIBLE DISPLAY

(75) Inventor: Kwang Hee Lee, Seoul (KR)

(73) Assignee: Pantech Co., Ltd., Seoul (KR)

( * ) Notice: Subject to any disclaimer, the term of this patent is extended or adjusted under 35 U.S.C. 154(b) by 872 days.

(21) Appl. No.: 12/852,675

(22) Filed: Aug. 9, 2010

(65) Prior Publication Data

US 2011/0187681 A1 Aug. 4, 2011

(30) Foreign Application Priority Data

Jan. 29, 2010 (KR) .................. 10-2010-0008586

(51) Int. Cl.
| | |
|---|---|
| *G06F 3/038* | (2013.01) |
| *G09G 5/00* | (2006.01) |
| *G06F 3/041* | (2006.01) |
| *G06F 1/16* | (2006.01) |
| *G06F 3/0488* | (2013.01) |
| *G06F 3/147* | (2006.01) |

(52) U.S. Cl.
CPC ............ *G06F 3/0414* (2013.01); *G06F 1/1652* (2013.01); *G06F 3/0488* (2013.01); *G06F 3/147* (2013.01); *G06F 2200/1637* (2013.01); *G09G 2340/0464* (2013.01); *G09G 2354/00* (2013.01); *G09G 2380/02* (2013.01)
USPC .......... 345/204; 345/173; 345/684; 345/661; 455/556.1; 455/566

(58) Field of Classification Search
USPC ....................................................... 345/204
See application file for complete search history.

(56) References Cited

U.S. PATENT DOCUMENTS

| | | | | |
|---|---|---|---|---|
| 5,602,566 | A | * | 2/1997 | Motosyuku et al. .......... 345/684 |
| 7,456,823 | B2 | * | 11/2008 | Poupyrev et al. ............ 345/173 |
| 2008/0291225 | A1 | | 11/2008 | Arneson |
| 2008/0318635 | A1 | * | 12/2008 | Yoon et al. .................... 455/566 |
| 2009/0219247 | A1 | | 9/2009 | Watanabe et al. |
| 2009/0237371 | A1 | * | 9/2009 | Kim et al. .................... 345/173 |
| 2010/0029327 | A1 | * | 2/2010 | Jee ............................. 455/556.1 |
| 2010/0045705 | A1 | * | 2/2010 | Vertegaal et al. ............. 345/661 |

FOREIGN PATENT DOCUMENTS

| | | |
|---|---|---|
| JP | 2003-058099 | 2/2003 |
| JP | 2005-165129 | 6/2005 |
| JP | 2007-108441 | 4/2007 |
| KR | 1020070097007 | 10/2007 |
| WO | 2007/069116 | 6/2007 |

\* cited by examiner

*Primary Examiner* — Gerald Johnson
(74) *Attorney, Agent, or Firm* — H.C. Park & Associates, PLC

(57) ABSTRACT

The apparatus to control an image output position of a flexible display moves a position of an image output area in a screen area when the flexible display is rotated. The apparatus may include: a bending measurement unit to measure a bending degree of the flexible display; a rotation measurement unit to measure a rotation degree and a rotation direction of the flexible display; and a controller to output an image at an image output area, and move a position of the image output area.

20 Claims, 7 Drawing Sheets

(a)

(b)

FIG. 2
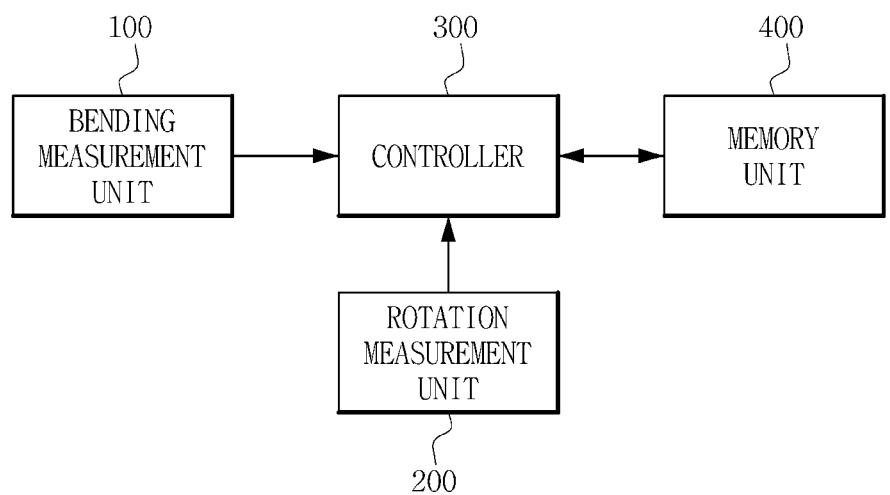
(a)
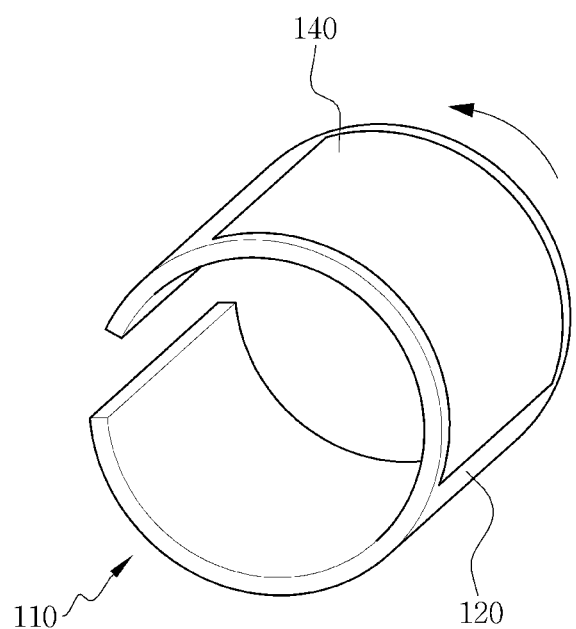
(b)

APPARATUS FOR SCREEN LOCATION CONTROL OF FLEXIBLE DISPLAY

CROSS-REFERENCE TO RELATED APPLICATION

This application claims priority from and the benefit of Korean Patent Application No. 10-2010-0008586, filed on Jan. 29, 2010, which is hereby incorporated by reference for all purposes as if fully set forth herein.

BACKGROUND

1. Field

This disclosure relates to an apparatus to control an image output position of a flexible display.

2. Discussion of the Background

A flexible display is a display device having the property of being easily bent and generally includes a screen area in which a number of display elements for outputting an image are distributed on a surface of the flexible display.

As illustrated in FIG. 1, a position of an image output area 14 is fixed at a particular position on a screen area 12 of a flexible display 10. Therefore, in a case where an outer shape of the flexible display 10 is bent and the image output area 14 forms a curved surface, the image output area 14 is rotated by a rotating operation. Accordingly, the image output area 14 sometimes disappears from a user's sight.

As described above, when the image output area 14 of the flexible display 10 disappears from user's sight even partially, the image output through the image output area 14 is deteriorated, and the user cannot accurately see the image output from the entire image output area 14. Therefore, there are problems in accurately viewing the image output from the image output area 14. For example, the user has to physically move to a space where the entire image output area 14 comes into sight, or the user has to directly move the flexible display 10 in such a direction that the entire image output area 14 comes into sight.

SUMMARY

Exemplary embodiments of the present invention provide an apparatus to control an image output position of a flexible display, capable of moving a position of an image output area in a screen area if the flexible display is rotated, or moving the image output area to a particular position through a simple external operation.

Additional features of the invention will be set forth in the description which follows, and in part will be apparent from the description, or may be learned by practice of the invention.

An exemplary embodiment provides an apparatus to control an image output position of a flexible display, the apparatus including: a bending measurement unit to measure a bending degree of the flexible display; a rotation measurement unit to measure a rotation degree and a rotation direction of the flexible display if the flexible display rotates; and a controller to output an image at an image output area in a screen area of the flexible display, and to form the image output area in the screen area of the flexible display according to the measured bending degree, the measured rotation degree, and the measured rotation direction.

An exemplary embodiment provides an apparatus to control an image output position of a flexible display, the apparatus including: a bending measurement unit to measure a bending degree of the flexible display; a highest position detection unit to detect a portion of the flexible display corresponding to a highest point in a direction opposite to gravity on a screen area of the flexible display if the highest point is changed by rotation of the flexible display; and a controller to output an image at an image output area in the screen area of the flexible display, and, if the flexible display is bent, form an image output area with respect to the highest point in the direction opposite to gravity detected by the highest point detection unit.

An exemplary embodiment provides an apparatus to control an image output position of a flexible display, the apparatus including: a touch detection unit to detect a touch of the flexible display; and a controller to output an image at an image output area in a screen area of the flexible display, and to form the image output area in the screen area of the flexible display depending on a type of the touch detected by the touch detection unit.

An exemplary embodiment provides an apparatus to control an image output position of a flexible display, the apparatus including: an object detection unit to detect a distance of an object from the flexible display; and a controller to output an image at an image output area in a screen area of the flexible display, and to move the image output area in the screen area of the flexible display in a particular direction if the distance of the detected object from the flexible display is smaller than a threshold value.

An exemplary embodiment provides an apparatus to control an image output position of a flexible display, the apparatus including: an electromyographic detection unit to detect an electrical signal produced by a muscle; a memory unit to store movement information corresponding to a pattern of the detected electrical signal; and a controller to output an image at an image output area in a screen area of the flexible display, to search the memory unit for the movement information of the image output area corresponding to the pattern of the detected electrical signal, and to move the image output area in the screen area depending on the searched movement information.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 2(a) is a block diagram schematically illustrating a flexible display according to an exemplary embodiment.

FIG. 2(b) is perspective view of a flexible display according to an exemplary embodiment.

DETAILED DESCRIPTION OF THE ILLUSTRATED EMBODIMENTS

Figure 1:
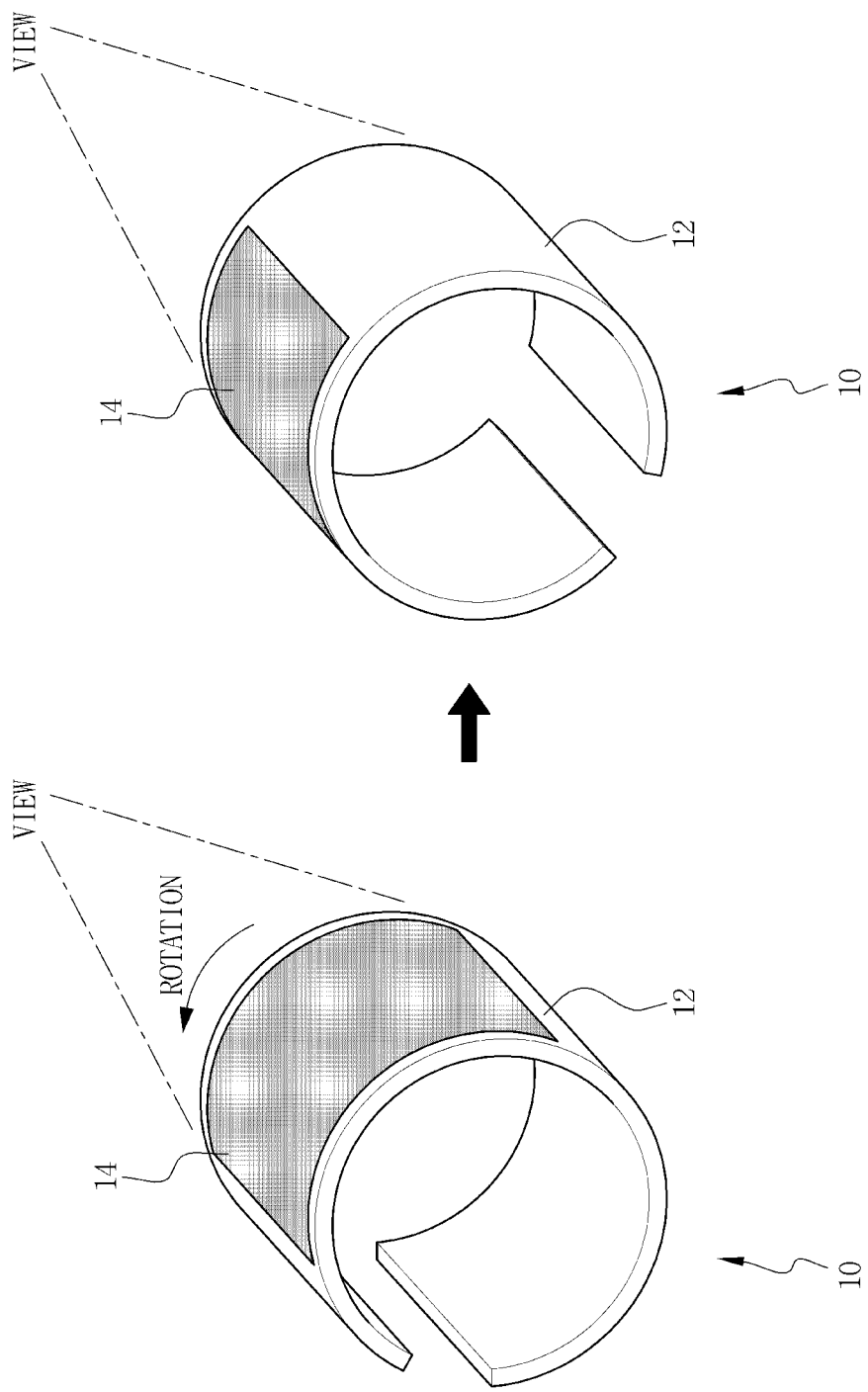
FIG. 1 is a diagram illustrating a general flexible display while rotating.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

Hereinafter, an apparatus to control an image output position of a flexible display according to exemplary embodiments will be described in detail with reference to the accompanying drawings.

FIG. 2(a) is a block diagram schematically illustrating a flexible display according to an exemplary embodiment, and FIG. 2(b) is perspective view of a flexible display according to an exemplary embodiment. Referring to FIG. 2(a), an apparatus to control an image output position of a flexible display according to an exemplary embodiment includes a bending measurement unit 100, a rotation measurement unit 200, a controller 300, and a memory unit 400. The apparatus controls a flexible display 110 as illustrated in FIG. 2(b) to move a position of an image output area 140 in a screen area 120 if the flexible display is rotated 110.

The bending measurement unit 100 measures a bending degree or value of the flexible display 110. The rotation measurement unit 200 measures a rotation degree and a rotation direction of the flexible display 110 while the flexible display 110 rotates in a direction in which the flexible display 110 is bent.

The controller 300 outputs an input image, for example, an image input from an image input device, such as a video or a digital video recorder (DVR). The controller 300 outputs the input image through the image output area 140 in the screen area 120 of the flexible display 110. In addition, the controller 300 recognizes a bend of the flexible display 110 on the basis of a value measured by the bending measurement unit 100 and recognizes a rotation of the flexible display 110 on the basis of a value measured by the rotation measurement unit 200. Moreover, the controller 300 moves a position of the image output area 140 from a previous position in the screen area 120 of the flexible display 110 according to the values measured by the bending measurement unit 100 and the rotation measurement unit 200. Further, the controller 300 may change an aspect ratio of or proportions of the image output area 140 according to the values measured by the bending measurement unit 100 and the rotation measurement unit 200.

The memory unit 400 stores information on shapes of the flexible display 110 (e.g., cylindrical, semicircular, or planar shape) depending on the bending degree of the flexible display 110 and allows the controller 300 to search the stored information.

For example, the bending measurement unit 100 may include bend sensors disposed in the flexible display 110 at intervals. The rotation measurement unit 200 may include a gravity sensor or a gyro sensor. The gravity sensor or the gyro sensor may be disposed at an edge of the flexible display 110.

The controller 300 moves the position of the image output area 140 from the previous position by a rotation degree of the flexible display 110 measured by the rotation measurement unit 200 if the flexible display 110 is rotated in a bent state. Moreover, the controller 300 rotates the image output area 140 in a direction opposite to a rotation direction of the flexible display 110 measured by the rotation measurement unit 200 in the screen area 120 of the flexible display 110.

Particularly, the controller 300 searches the memory unit 400 to check a shape of the flexible display 110 depending on the bending degree measured by the bending measurement unit 100, and moves the position of the image output area 140 in the screen area 120 of the flexible display 110 from the previous position according to the checking result. For example, if the shape of the flexible display 110 is cylindrical, and if the flexible display 110 rotates, the controller 300 moves the position of the image output area 140 in the direction opposite to the rotation direction of the flexible display 110 measured by the rotation measurement unit 200 from the previous position by the rotation degree of the flexible display 110 measured by the rotation measurement unit 200.

If the flexible display 110 is not bent, or if the flexible display 110 does not rotate although the flexible display 110 is bent, the controller 300 forms the image output area 140 with respect to a position designated in the bending direction. Here, the position designated in the bending direction may be determined to be a side edge of the image output area 140.

Figure 3:
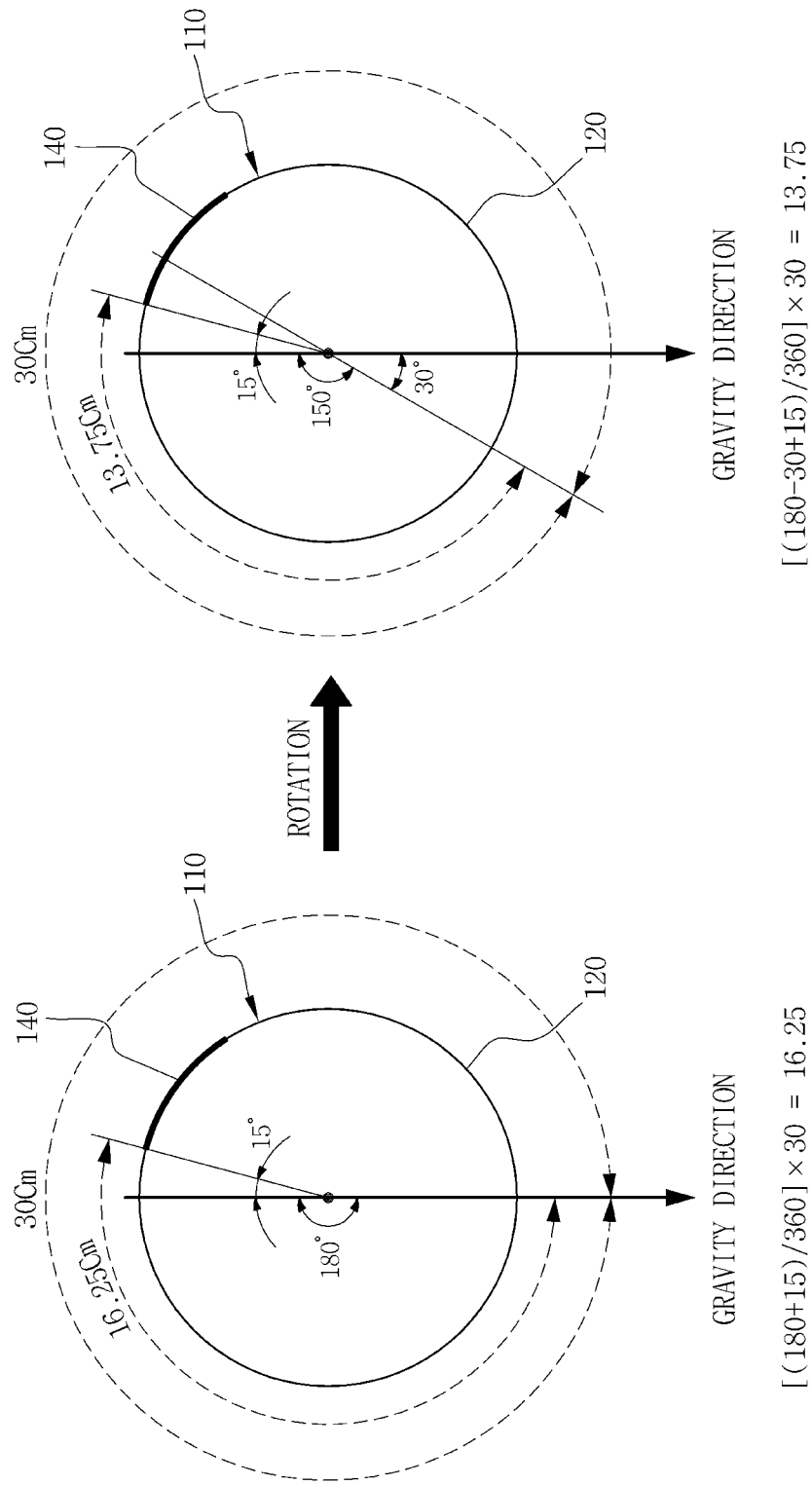
FIG. 3 is a diagram for explaining a controller of FIG. 2.

FIG. 3 is a diagram for explaining a controller of FIG. 2. Referring to FIG. 3, a cylindrical flexible display 110 having a circumference of 30 cm is illustrated. In FIG. 3, the position designated in the bending direction of the image output area 140 is set to a position inclined clockwise by 15° from a direction opposite to gravity with respect to the origin of the cylinder, that is, a position 16.25 cm from a side edge of the flexible display 110.

The controller 300 forms the image output area 140 with respect to the position designated in the bending direction in the state where the flexible display 110 does not rotate. Thereafter, if the flexible display 110 rotates clockwise by 30°, the controller 300 recognizes through the rotation measurement unit 200 that the flexible display 110 rotates clockwise by 30°. In addition, the controller 300 moves the image output area 140 that has been formed with respect to the position 16.25 cm ([(180+15)/360]*30=16.25) from the side edge of the flexible display 110 to be formed with respect to a position 13.75 cm ([(180−30+15)/360]*30=13.75) from the side edge of the flexible display 110.

In this case, in an initial state, the image output area 140 is formed so that the side edge of the image output area 140 is disposed at the position designated in the bending direction, that is, at the position 16.25 cm from the side edge of the flexible display 110 in the bending direction. Thereafter, when the flexible display 110 rotates clockwise by 30°, the side edge of the image output area 140 is disposed at the position 13.75 cm from the side edge of the flexible display 110.

Figure 4:
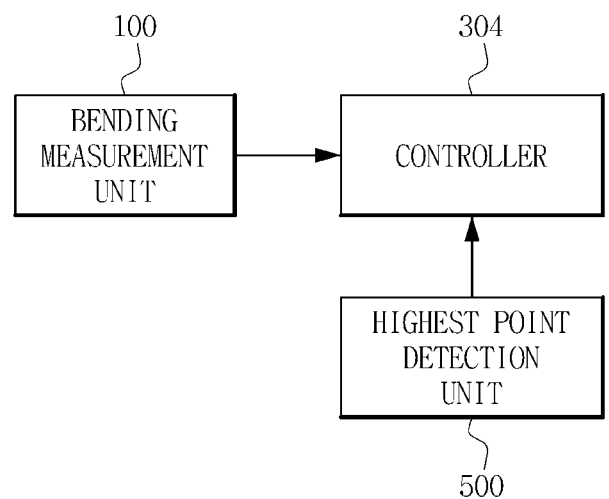
FIG. 4 is a block diagram schematically illustrating a flexible display according to an exemplary embodiment.
Figure 5:
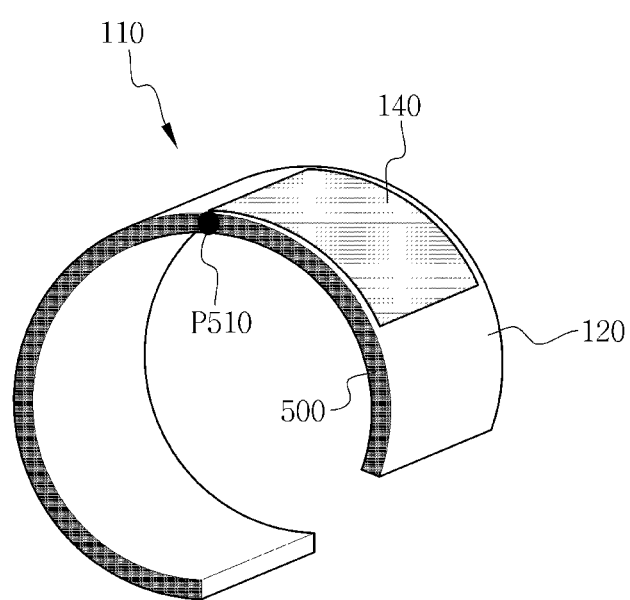
FIG. 5 is a diagram illustrating a highest point detection unit installed in the flexible display of FIG. 4.

FIG. 4 is a block diagram schematically illustrating a flexible display according to an exemplary embodiment. FIG. 5 is a diagram illustrating a highest point detection unit installed in the flexible display of FIG. 4. Referring to FIG. 4, an apparatus to control an image output position of a flexible display according to an exemplary embodiment includes a bending measurement unit 100, a highest point detection unit 500, and a controller 304.

The bending measurement unit 100 measures a bending degree of a flexible display 110. The highest point detection unit 500 detects a position corresponding to a highest point in a direction opposite to gravity on a screen area 120 of the flexible display 110. The highest point may change with the rotation of the flexible display 110 in a bending direction.

The controller 304 outputs an input image through an image output area 140 in the screen area 120 of the flexible display 110 and recognizes a bend of the flexible display 110 on the basis of a value measured by the bending measurement unit 100. When the flexible display 110 is bent, the controller 304 forms the image output area 140 with respect to the position corresponding to the highest point 510 in the direction opposite to the gravity on the screen area 120 of the flexible display 110 detected by the highest point detection unit 500.

For example, as illustrated in FIG. 5, the highest point detection unit 500 may be disposed along an upper end or a lower end of the screen area 120 of the flexible display 110. A pointer is positioned at a highest point P510 in the direction opposite to gravity, and the highest point detection unit 500 may be configured as a digital level to generate a digital signal indicating a position of the pointer and to transmit the digital signal to the controller 304.

If the highest point detection unit 500 is configured as the digital level, and if the pointer position of the digital level changes with the rotation of the bent flexible display 110 in the bending direction, the controller 304 determines a position of the screen area 120 corresponding to the pointer position and forms the image output area 140 with respect to the determined position. Here, the position of the screen area 120 corresponding to the pointer position may be at the side edge of the image output area 140 or at an edge of the flexible display 110. Accordingly, the position of the image output area 140 is moved in the screen area 120 according to the changing pointer position when the flexible display 110 rotates in the bending direction.

Figure 6:
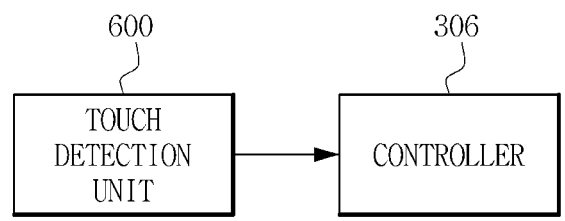
FIG. 6 is a block diagram schematically illustrating a flexible display according to an exemplary embodiment.
Figure 7:
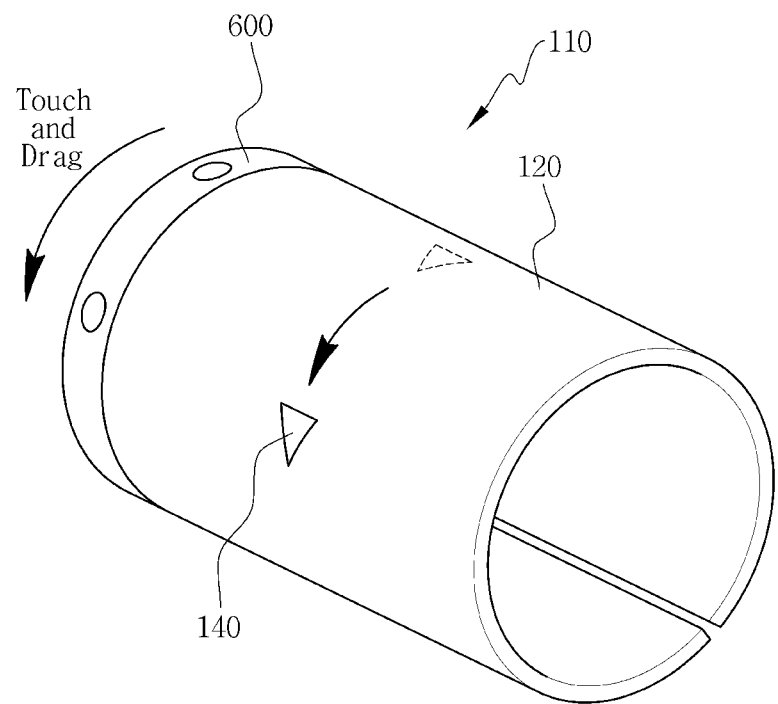
FIG. 7 is a diagram illustrating a touch detection unit installed in the flexible display of FIG. 6.

FIG. 6 is a block diagram schematically illustrating a flexible display according to an exemplary embodiment. FIG. 7 is a diagram illustrating a touch detection unit installed in the flexible display of FIG. 6. Referring to FIG. 6, an apparatus to control an image output position of a flexible display according to an exemplary embodiment includes a touch detection unit 600 to detect a touch, and a controller 306 to control a position of an image output area 140.

The controller 306 outputs an input image through the image output area 140 in a screen area 120 of a flexible display 110. The controller 306 checks a type of the touch detected by the touch detection unit 600 and moves a position of the image output area 140 in the screen area 120 of the flexible display 110 from a previous position depending on the checked touch type.

For example, as illustrated in FIG. 7, the touch detection unit 600 may be disposed in the screen area 120 of the flexible display 110. Here, the screen area 120 in which the touch detection unit 600 is disposed may be configured, for example, as a touch screen. Further, the screen area 120 may include a touch screen.

The controller 306 moves the position of the image output area 140 depending on a type of the touch detected by the touch detection unit 600. For example, when the detected touch type is a touch and drag, the controller 306 moves the position of the image output area 140 in the screen area 120 of the flexible display 110 from a previous position to correspond to a drag distance and a drag direction.

Figure 8:
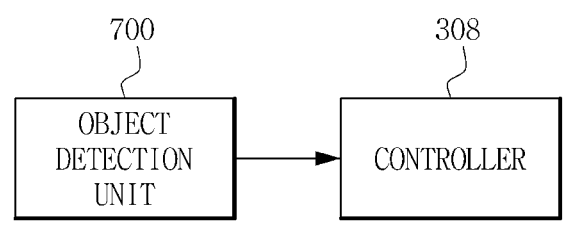
FIG. 8 is a block diagram schematically illustrating a flexible display according to an exemplary embodiment.
Figure 9:
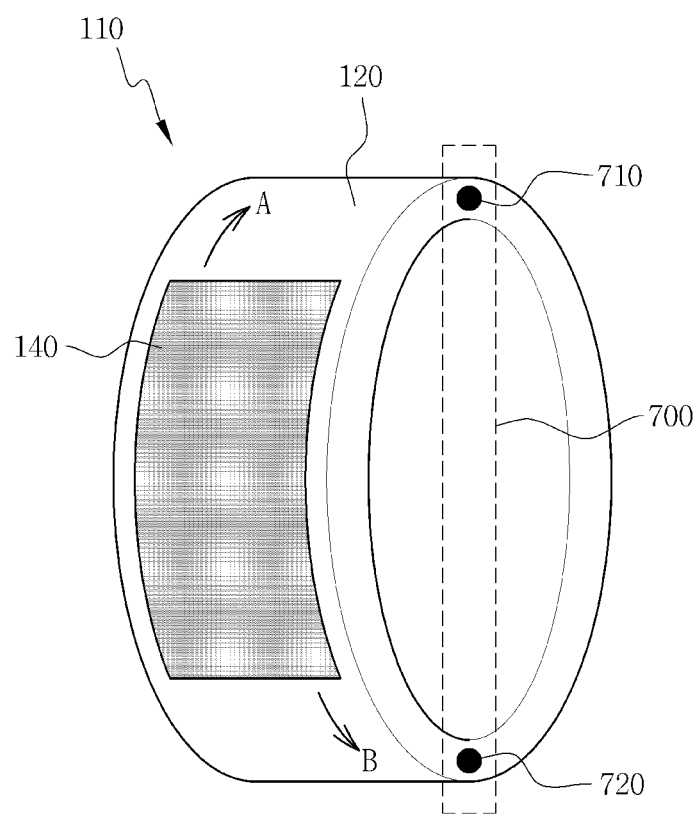
FIG. 9 is a diagram illustrating an object detection unit installed in the flexible display of FIG. 8.

FIG. 8 is a block diagram schematically illustrating a flexible display according to an exemplary embodiment. FIG. 9 is a diagram illustrating an object detection unit installed in the flexible display of FIG. 8. Referring to FIG. 8, an apparatus to control an image output position of a flexible display according to an exemplary embodiment includes an object detection unit 700 to detect a distance from an object and a controller 308 to control an image output area 140.

The controller 308 outputs an input image through the image output area 140 in a screen area 120 of a flexible display 110. If a distance from an object detected by the object detection unit 700 is smaller than a threshold value, the controller 308 moves the image output area 140 on the screen area 120 in a particular direction (for example, in either of two bending directions) from a previous position.

For example, as illustrated in FIG. 9, at least one object detection unit 700 may be disposed in the flexible display 110 or in the vicinity of the flexible display. The object detection unit 700 may be configured as an ultrasonic sensor or an infrared sensor.

For example, if a distance from an object detected by a first object detection unit 710 is smaller than a threshold value, the controller 308 may move the image output area 140 in an A direction among bending directions A and B of the flexible display 110 from a previous position. If a distance from an object detected by a second object detection unit 720 is smaller than a threshold value, the controller 308 may move the image output area 140 in the B direction among the bending directions A and B of the flexible display 110 from a previous position.

On the other hand, while the controller 308 moves the image output area 140 in the screen area 120, if the distance from the object detected by the object detection unit 700 is equal to or greater than the threshold value, the controller 308 stops the movement of the image output area 140.

In addition, when the distance from the object detected by the object detection unit 700 is smaller than the threshold value, the controller 308 gradually increases or decreases a movement speed of the image output area 140 as the distance from the object is reduced.

Figure 10:
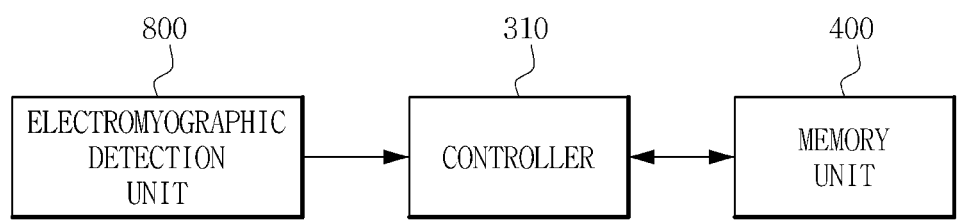
FIG. 10 is a block diagram schematically illustrating a flexible display according to an exemplary embodiment.

FIG. 10 is a block diagram schematically illustrating a flexible display according to an exemplary embodiment.

Referring to FIG. 10, an apparatus to control an image output position of a flexible display according to an exemplary embodiment includes an electromyographic detection unit 800, a controller 310, and a memory unit 400.

The electromyographic detection unit 800 comes in contact with a particular portion of a human body and detects an electrical signal produced by a muscle movement of the portion of the human body.

The memory unit 400 stores movement information of the image output area 140 corresponding to a pattern of the electrical signal produced by the muscle movement of the body portion.

The controller 310 outputs an input image through the image output area 140 in the screen area 120 of the flexible display 110. The controller 310 searches the memory unit 400 for the movement information of the image output area 140. The movement information corresponds to the pattern of the electrical signal detected by the electromyographic detection unit 800. And, the controller 310 moves the image output area 140 in the screen area 120 from the previous position depending on the searched movement information of the image output area 140.

For example, the electromyographic detection unit 800 may come in contact with a portion, such as wrist, finger, a portion near an eyeball, or a neck, and transmit an electrical signal produced by the muscle movement of the contacted body portion to the controller 310 via wired or wireless communication. That is, the electromyographic detection unit 800 and the controller 310 may include communication modules for wire or wireless communications therebetween.

The controller 310 may move the image output area 140 in the screen area 120 from the previous position gradually with time or at once.

The apparatus to control an image output position of the flexible display according to this disclosure is not limited by the above-mentioned embodiments and may be modified in various manners without departing from the spirit and scope of this disclosure.

The apparatus to control an image output position of the flexible display according to the exemplary embodiments is capable of moving the position of the image output area in the screen area to a position corresponding to a field of view of the user during the rotation of the flexible display or moving the image output area to a particular position through a simple external operation.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus to control an image output position of a flexible display, the apparatus comprising:
   a bending measurement unit to measure a bending degree of the flexible display;
   a rotation measurement unit to measure a rotation degree and a rotation direction of the flexible display; and
   a controller to determine a first portion of a screen area of the flexible display as an image output area, and to output an image at the image output area in the screen area of the flexible display, the first portion of the screen area being determined by calculating a position based on a circumference of the flexible display and the measured rotation degree,
   wherein the first portion is determined in the screen area of the flexible display according to the measured bending degree, the measured rotation degree, and the measured rotation direction.

2. The apparatus of claim 1, wherein the controller checks a shape of the flexible display according to the measured bending degree, and, if the shape of the flexible display is determined as a first shape, moves a position of the image output area to a second portion of the screen area of the flexible display according to the measured bending degree, the measured rotation degree, and the measured rotation direction, the second portion configured to be distinguished by a second edge if the second portion is determined as the image output area, and
   if the shape of the flexible display is determined as a second shape, the controller forms the image output area with respect to a position designated in the screen area.

3. The apparatus of claim 2, wherein the controller determines a first edge or the second edge in the screen area according to the measured bending degree and the measured rotation degree.

4. The apparatus of claim 1, wherein, if the flexible display rotates in a bent state, the controller moves the position of the image output area in the screen area in a direction opposite to the measured rotation direction by the measured rotation degree, and
   wherein, if the flexible display is in a non-bent state, the controller forms the image output area with respect to a position designated in the screen area.

5. The apparatus of claim 1, further comprising a memory unit to store shape information of the flexible display according to bending degrees of the flexible display and to allow the controller to search the stored information.

6. The apparatus of claim 5, wherein the controller checks a shape of the flexible display according to the measured bending degree by searching the memory unit, and if the shape of the flexible display is cylindrical according to the checking result, moves the position of the image output area in the screen area of the flexible display in the direction opposite to the measured rotation direction of the flexible display by the measured rotation degree of the flexible display if the flexible display rotates.

7. The apparatus of claim 1, wherein the controller forms the image output area with respect to a position designated in the screen area if there is no bend or rotation of the flexible display.

8. The apparatus of claim 1, wherein the controller changes an aspect ratio of the image output area in the screen area according to the measured bending degree and the measured rotation degree.

9. An apparatus to control an image output position of a flexible display, the apparatus comprising:
   a bending measurement unit to measure a bending degree of the flexible display;
   a highest position detection unit to detect a portion of the flexible display corresponding to a highest point in a direction opposite to gravity on a screen area of the flexible display; and
   a controller to output an image at an image output area in the screen area of the flexible display, and, if the flexible display is bent, to form an image output area with respect to the highest point in the direction opposite to gravity detected by the highest point detection unit.

10. The apparatus of claim 9, wherein the highest point detection unit detects the highest point while the highest point changes according to rotation of the flexible display.

11. The apparatus of claim 9, wherein the controller determines a first portion of the screen area or a second portion of the screen area of the flexible display as the image output area, and wherein the first portion is configured to be distinguished from another area of the flexible display by a first edge if the image is outputted in the first portion, and the second portion is configured to be distinguished from another area of the flexible display by a second edge if the image is outputted in the second portion.

12. The apparatus of claim 9, wherein the controller forms the image output area with respect to a pointer position, and wherein the pointer position corresponds to a side edge of the image output area or a edge of the flexible display.

13. An apparatus to control an image output position of a flexible display, the apparatus comprising:

a bending measurement unit to measure a bending degree of the flexible display;

a touch detection unit to detect a touch of the flexible display; and a controller to determine a first portion of a screen area of the flexible display as an image output area, and to output an image at the image output area in the screen area of the flexible display, wherein the first portion is determined in the screen area of the flexible display according to a type of the touch detected by the touch detection unit and the measured bending degree, and wherein the controller changes an aspect ratio of the image output area in the screen area according to the measured bending degree and the measured rotation degree.

14. The apparatus of claim 13, wherein the controller moves the image output area to a second portion of the screen area of the flexible display according to the type of the touch detected by the touch detection unit and the measured bending degree, the second portion configured to be distinguished by a second edge if the second portion is determined as the image output area.

15. The apparatus of claim 13, wherein, if the touch type is a touch and drag, the controller moves the position of the image output area in the screen area of the flexible display to correspond to a drag distance and a drag direction of the touch and drag.

16. An apparatus to control an image output position of a flexible display, the apparatus comprising:

a bending measurement unit to measure a bending degree of the flexible display;

an object detection unit to detect a distance of an object from the flexible display; and a controller to determine a first portion of a screen area of the flexible display as an image output area, to output an image at the image output area in the screen area of the flexible display, and to move the image output area to a second portion of the screen area of the flexible display in a particular direction if the distance of the detected object from the flexible display is smaller than a threshold value, wherein at least one of the first portion and the second portion is determined in the screen area of the flexible display according to the measured bending degree, and wherein the controller changes an aspect ratio of the image output area in the screen area according to the measured bending degree and the measured rotation degree.

17. The apparatus of claim 16, wherein, if the distance of the detected object is equal to or greater than the threshold value, the controller stops the movement of the image output area.

18. The apparatus of claim 16, wherein, if the distance of the detected object is smaller than the threshold value, the controller increases or decreases a movement speed of the image output area as the distance of the detected object is reduced.

19. An apparatus to control an image output position of a flexible display, the apparatus comprising:

a bending measurement unit to measure a bending degree of the flexible display;

an electromyographic detection unit to detect an electrical signal produced by a muscle;

a memory unit to store movement information corresponding to a pattern of the detected electrical signal; and a controller to determine a first portion of a screen area of the flexible display as an image output area, to output an image at the image output area in the screen area of the flexible display, to search the memory unit for the movement information of the image output area corresponding to the pattern of the detected electrical signal, and to move the image output area to a second portion of the screen area according to the searched movement information and the measured bending degree, and wherein the controller changes an aspect ratio of the image output area in the screen area according to the measured bending degree and the measured rotation degree.

20. The apparatus of claim 19, wherein the controller moves the image output area in the screen area gradually with time or at once.

* * * * *